United States Patent [19]
Capitanescu

[11] Patent Number: 5,134,268
[45] Date of Patent: Jul. 28, 1992

[54] SUBMERGED ARC WELDING SYSTEM

[76] Inventor: Teodor D. Capitanescu, Bay D 3518, 62 Avenue S.E., Calgary, Alberta, Canada, T2C 1Z8

[21] Appl. No.: 585,512

[22] Filed: Sep. 20, 1990

[30] Foreign Application Priority Data

Feb. 23, 1990 [CA] Canada ................................. 2010872

[51] Int. Cl.$^5$ ............................. B23K 9/18; B23K 9/04
[52] U.S. Cl. .................................... 219/73.11; 219/61; 219/76.14
[58] Field of Search ...................... 219/73, 73.11, 76.1, 219/76.12, 76.14, 60 R, 61

[56] References Cited

U.S. PATENT DOCUMENTS

| | | | |
|---|---|---|---|
| 2,187,786 | 1/1940 | Jacobus | 219/61 |
| 3,002,081 | 9/1961 | Wenzel | 219/76.14 |
| 3,209,119 | 9/1965 | Keidel et al. | 219/73 R |
| 3,339,055 | 8/1967 | Carter | 219/76.14 |
| 3,582,599 | 6/1971 | Yohn | 219/61 |

*Primary Examiner*—Clifford C. Shaw
*Attorney, Agent, or Firm*—George Haining Dunsmuir

[57] ABSTRACT

On conventional method of surfacing the interior of a pipe employing arc welding techniques is to apply a series of annular weld strips to the pipe. A simpler, more efficient method is to apply longitudinally extending strips to the interior of the pipe, while rotating the pipe between each welding metal application. A device for effecting this method includes an elongated casing formed of insulating material extending between a block at one end and a crescent-shaped plug at the other end, a rigid tube extending between the block and the plug, a tube coaxial with the rigid tube extending through the block and the rigid tube into the plug, the last mentioned tube carrying a plastic conduit through which a welding wire is inserted into a tip extending outwardly from the outer free end of the plug, coolant inlet and outlets in the casing, a flux inlet in the block end of the casing for carrying welding flux to an outlet beneath the plug, and a guide extending downwardly from the casing for guiding the device while it is drawn through a pipe during application of a weld strip to the pipe interior.

9 Claims, 3 Drawing Sheets

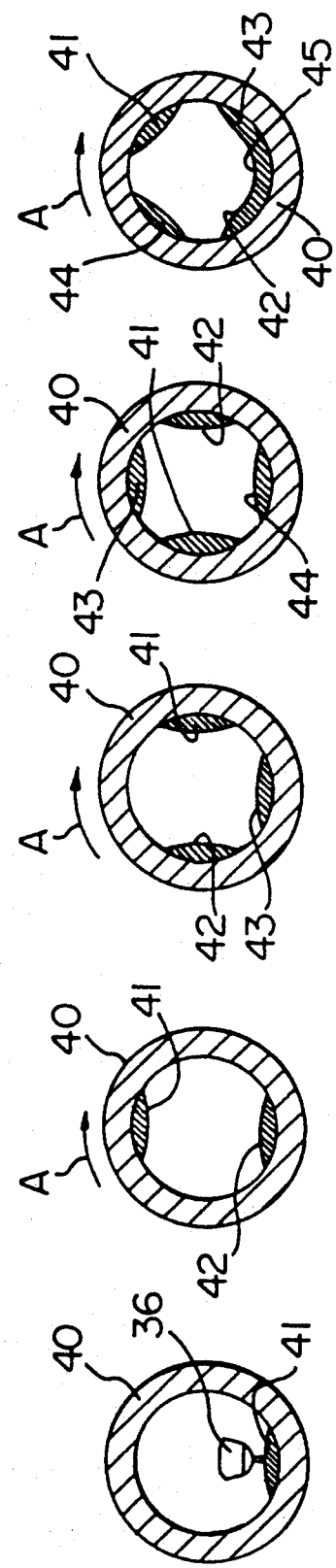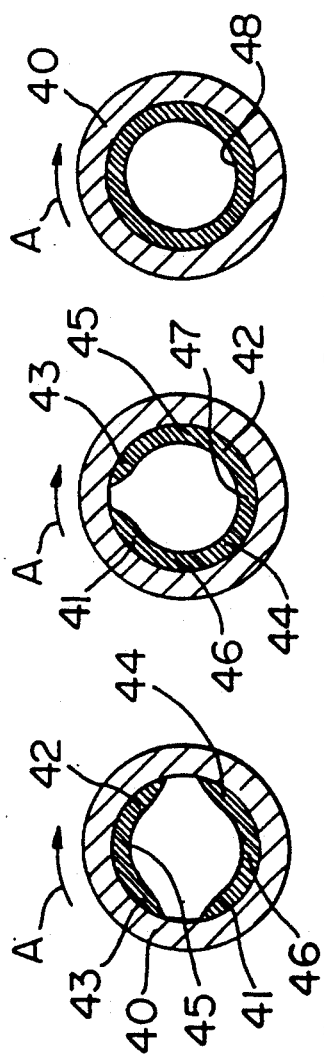

SUBMERGED ARC WELDING SYSTEM

BACKGROUND OF THE INVENTION

This invention relates to a method and a device for arc welding, and to a method of surfacing a metal article using the device.

More specifically, the invention concerns a method and device for the protective surfacing or coating (commonly known as overlaying) of the interior of a hollow structure. The most common use of the device is to surface the inner wall of a pipe having an interior diameter of at least one inch.

The conventional method of surfacing the inner surface of tubular articles is to use apparatuses including a curved head or "goose neck" for directing filler metal towards a tip. One method of surfacing the interior of a pipe is to insert a welding tool into the pipe and to rotate the pipe to form an annular metal strip. The pipe or welding tool is then advanced, and another strip is applied to the pipe. This method is quite slow, particularly on large pipes, since the weld head must solidify to avoid flowing during pipe rotation.

Another method of surfacing or coating the interior of a small diameter pipe is the insertion of a liner or sleeve into the pipe, followed by welding of the sleeve and pipe at the ends thereof. Because of the different coefficients of expansion of the pipe and sleeve, this method is unsatisfactory.

There are many machines or apparatuses for welding the interior of tubular articles described in the patent literature. Examples of such machines or apparatuses are found in U.S. Pat. Nos. 1,555,034, which issued to A. M. Stanley et al on Sep. 29, 1925; 2,606,267, which issued to T. McElrath, Jr. on Aug. 5, 1952; 3,018,360, which issued to R. D. Engel on Jan. 23, 1962; 3,265,856, which issued to S. Cecil on Aug. 9, 1966; 3,305,664, which issued to M. M. Kensrue on Feb. 21, 1967; 3,397,298, which issued to I. V. Nelson on Aug. 13, 1968; 3,463,902, which issued to W. A. Bircher on Aug. 26, 1969; 3,836,747, which issued to P. M. Wlos on Sep. 17, 1974; 4,215,809, which issued to D. L. Davis on Aug. 5, 1980; 4,379,963, which issued to G. Kazlauskas on Apr. 12, 1983; 4,571,475, which issued to G. B. Rabe on Feb. 18, 1986; 4,727,238, which issued to R. N. Mann on Feb. 23, 1988 and 4,731,518, which issued to D. R. Parmelee et al on Mar. 15, 1988. Many of these patents disclose relatively complicated devices, some of which are of the goose neck type described above.

An object of the present invention is to provide a relatively simple device for performing arc welding on the interior of an article such as a pipe.

Another object of the invention is to provide a simple, efficient method of surfacing the interior of a hollow article using the device described herein.

A further object of the invention is to provide a method of surfacing the interior of a hollow article by welding such that substantially "smooth" weld is produced which serves to reduce the possibility of weld deposit defects commonly occurring by virtue of irregular weld deposits.

SUMMARY OF THE INVENTION

According to one aspect, the invention relates to an arc welding device for applying a protective surface or coating to the interior of a hollow, electrically conductive metal article comprising elongated, tubular casing means formed of electrically insulating material for insertion into the hollow article; solid block means on one end of said casing means for connecting the device to a tractor for moving the device longitudinally in the hollow article; solid plug means in the other end of said tube means; solid first tube means extending between said block means and said plug means; second tube means coaxial with and smaller in diameter than said first tube means extending through said block means, said first tube means and into said plug means; plastic conduit means extending through said second tube means for carrying a consumable welding electrode through said second tube means into said plug means; arcuate contact tip means in said plug means for receiving said electrode and directing the electrode into contact with the interior of the article; flux inlet means for introducing welding flux into the block means end of said casing means; flux outlet means into the plug means end of said casing means; flux outlet means in the plug means end of said casing means for discharging the welding flux into the area of the outer free end of said tip means; coolant inlet means extending into said first tube means for introducing coolant into the plug means end of said first tube means; and coolant outlet means for discharging coolant from the block means end of said first tube means, whereby a consumable electrode can be fed through said conduit means and the tip means into electrical contact with the interior of the article while flux is fed to the contact area and the device is moved longitudinally to deposit a strip of metal liner on the interior of the article.

According to another aspect, the invention relates to a method of applying a protective surface as coating to the interior surface of a hollow, electrically conductive metal article comprising the steps of applying a first rectilinear strip of welding metal to one side of the interior surface; rotating the article through 180 degrees in one direction around a first axis parallel to the longitudinal axis of the strip; applying a second rectilinear strip of metal to a second side of the interior surface opposite to said one side; rotating the article in said one direction through 90 degrees around the first axis; applying a third rectilinear strip of metal to the interior of the article between the first and second strips; rotating the article in said one direction through 180 degrees around the first axis; and applying a fourth rectilinear strip of metal to the interior of the article opposite the third strip.

By using the above described method of applying longitudinally extending strips of welding metal to the interior of a pipe or other hollow article, the weld can solidify while the device is being moved longitudinally between the ends of the article. Thus, the only delay is during the period of time in which the trailing end of the weld strip solidifies.

BRIEF DESCRIPTION OF THE DRAWINGS

The invention will be described in greater detail with reference to the accompanying drawings, which illustrate a preferred embodiment of the invention, and wherein;

FIGS. 8a-8h are a series of schematic, cross-sectional views of a pipe during lining thereof using the device of FIGS. 1 to 7.

DESCRIPTION OF THE PREFERRED EMBODIMENT(S)

Figure 2:
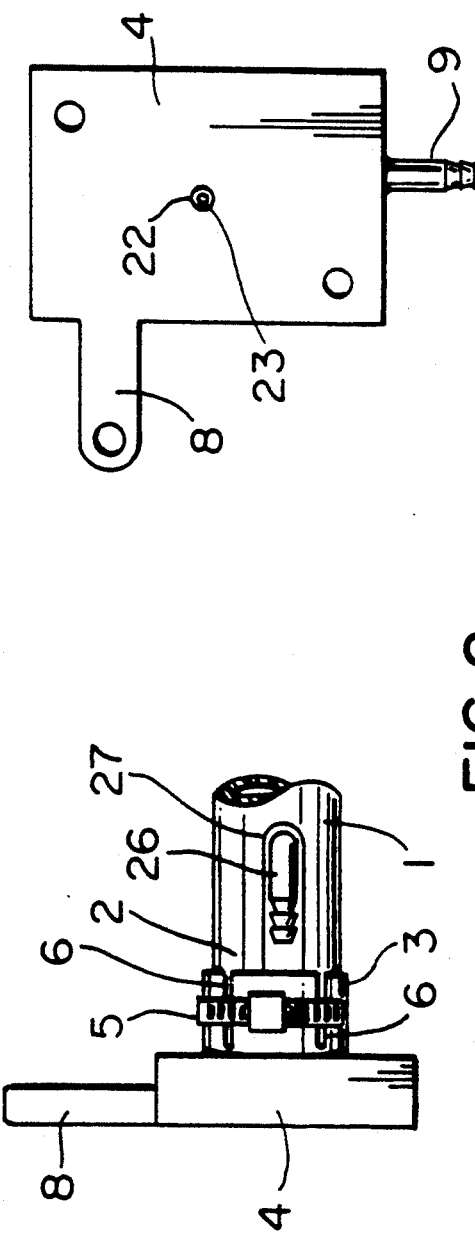
FIG. 2 is a top plan view of one end of the device of FIG. 1.
Figure 3:
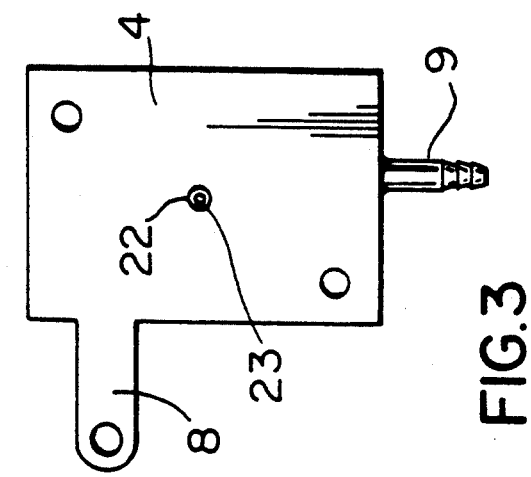
FIG. 3 is an end view of the device of FIG. 1 and as seen from the left thereof.

With reference to the drawings, the arc welding device of the present invention includes an elongated, cylindrical, tubular casing 1 formed of electrically insulating material. One end 2 of the casing 1 is mounted in a steel sleeve 3 extending outwardly from a brass block 4. The casing 1 is retained in the sleeve 3 by a hose clamp 5. Longitudinally extending slots 6 in the sleeve 3 permit the latter to flex against the casing 1 when the clamp 5 is tightened. The block 4 is a form of connector including an outlet passage 7 for discharging coolant from the interior of the casing 1, and an arm 8 (FIG. 2) for connecting the apparatus to a submerged arc welding tractor (not shown) which conveys the apparatus in a pipe or other hollow article. A coupler 9 mounted on the block 4 connects the passage 7 to a drain. The casing 1 is guided in the hollow article to be surfaced by a guide defined by a sleeve 10 with an arm 11 extending downwardly therefrom. The sleeve 10 is connected to the casing 1 by weld compound 12.

Figure 1:
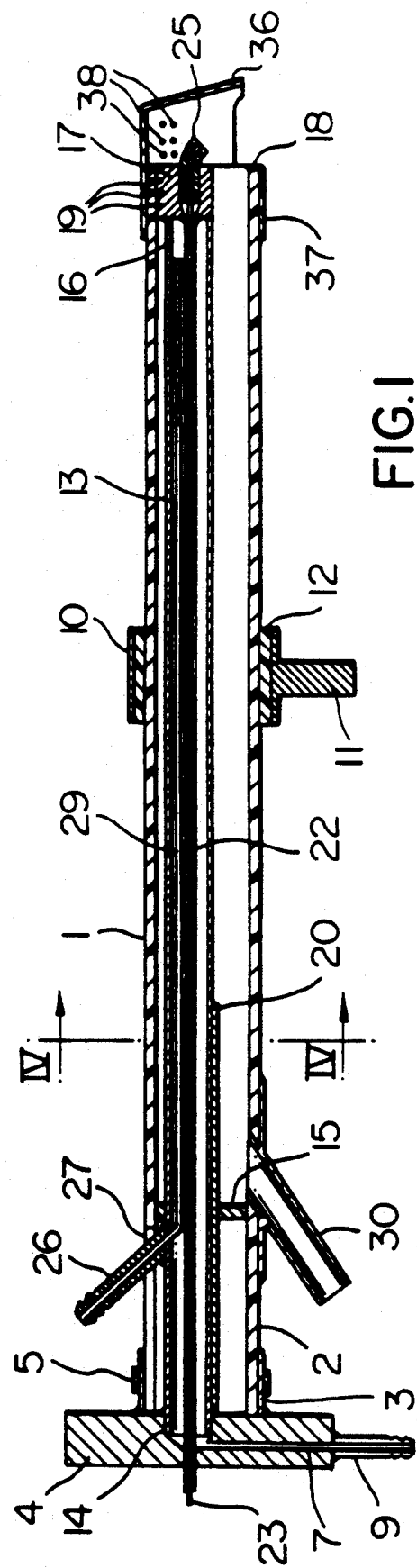
FIG. 1 is a longitudinal sectional view of an arc welding device in accordance with the present invention.
Figure 5:
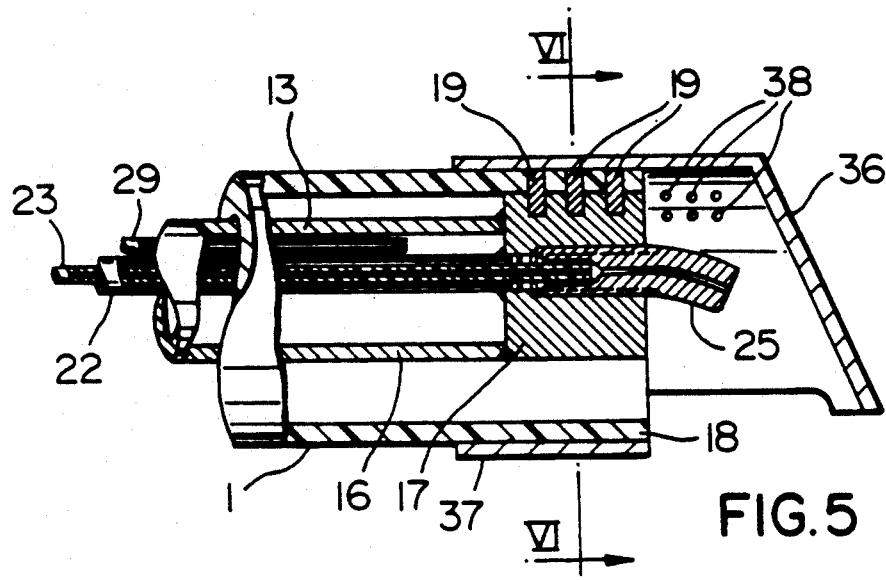
FIG. 5 is a longitudinal sectional view of the right end of the device of FIG. 1, on a larger scale.
Figure 4:
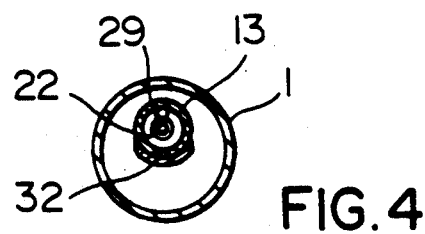
FIG. 4 is a cross section taken generally along line IV—IV of FIG. 1.
Figure 6:
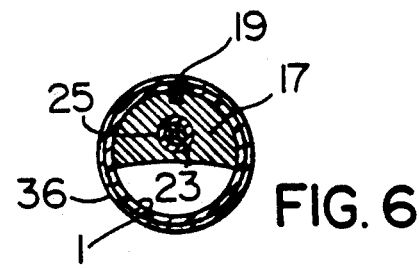
FIG. 6 is a cross section taken generally along line VI—VI of FIG. 5.

The casing 1 contains a copper tube 13, which extends substantially the entire length of the casing near the top thereof. One end 14 (FIG. 1) of the tube 13 is mounted in the block 4. The tube 13 extends through a partition 15 formed of weld compound which separates the inlet end of the casing 1 from the remainder of the interior of the casing. This partition 15 serves to prevent flow of flux towards block 4. The other end 16 of the tube 13 is brazed to a crescent-shaped brass plug 17 at the outer end 18 of the casing 1. The plug 17 is connected to the casing 1 by weld compound pins 19 (FIGS. 5 and 6). The bottom of the end 14 of the tube 13 is protected by an arcuate stainless steel plate 20 (FIG. 1) which serves to prevent erosion of the tube by flux as the flux enters the tube.

Figure 7:
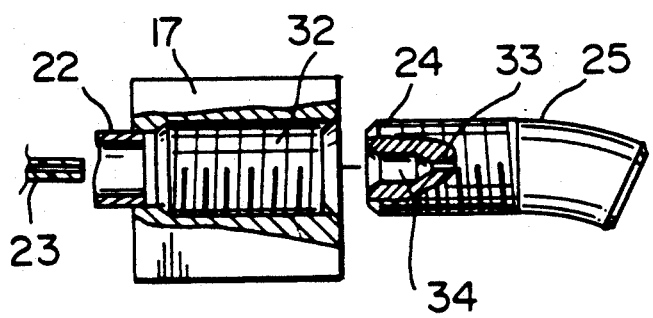
FIG. 7 is a partly sectioned, exploded view of a welding tip used in the device of FIGS. 1 to 6.

The block 4 and the plug 17 support a brass tube 22, which extends through the block 4, and axially through the entire length of the tube 13 into the inner end of the plug 17. The tube 22 carries plastic, e.g. Teflon (a trade mark for polytetrafluoroethylene) or nylon conduit 23, which extends through the tube 22 into the inner end 24 of a welding tip 25 in the plug 17 (FIG. 7). Coolant is introduced into the tube 13 via an inclined coupler 26 extending through slot 27 (FIG. 2) in the top of the casing 1. The coolant is carried from the coupler 26 to the end 16 of the tube 13 by a tube 29. As mentioned above, coolant is discharged via the outlet passage 7 in the block 4 and the coupler 9. Flux is introduced into the end 2 of the casing 1 beneath the tube 13 via an inlet duct 30.

As best shown in FIGS. 5 to 7, the straight inner end 24 of the welding tip 25 is threaded for securing the tip in a threaded passage 32 in the plug 17. The outer end of the tip 25 is arcuate for dispensing a weld strip downwardly against the article being surfaced. A passage 33 through the tip 25 receives a metal wire for forming the weld strip from the conduit 23, which extends into the enlarged inner end 34 of the passage 33. The discharge end of the casing 1 and the tip 25 are protected by a hood 36 (FIG. 5), which acts as a flux nozzle for directing flux downwardly. The hood 36 includes an annular inner end 37 for mounting the hood on the casing 1. Perforations 38 are provided in each side of the hood 36 for dissipating gases and the pressurized air carrying the flux.

The use of the device will be described with reference to FIG. 8. In order to line a pipe 40 with a metal liner, the device is connected to a submerged arc welding tractor (not shown), the coolant lines are connected to a source of coolant and a drain, and the flux line is connected to a source of flux. The device is placed in the pipe 40 to be lined and a consumable electrode in wire form (not shown) is fed through the conduit 23. The pipe 40 and the electrode are connected to a source of electrical power, and the electrode is passed through the conduit 23 into contact with the pipe 40. The device is moved longitudinally on the pipe 40 to deposit a longitudinally extending strip 41 of weld on the inner surface of the pipe. The formation of the strip 41 commences at one end of the pipe 40 and the device is retracted as surfacing is taking place. The device is returned to such one end of the pipe 40, which is then rotated through 180 degrees in the direction of arrow A, i.e. clockwise to position the weld strip 41 at the top of the pipe. A second strip 42 is formed by moving the device longitudinally of the pipe 40. As illustrated in FIGS. 8(c) to 8(h), the process is repeated six additional times during which, for example, strips 43 to 48 are applied until the entire inner surface of the pipe 40 is surfaced. Between formation of the second and third strips 42 and 43, respectively, the pipe 40 is rotated through 90 degrees—FIGS. 8(b)-8(c). The subsequent rotations are through 180 degrees—FIGS. 8(e) and 8(f), 90 degrees—FIGS. 8(f) and 8(g), and 180 degrees—FIGS. 8(g) and 8(h). Of course, the number of passes along the length of the pipe 40 will depend upon the interior circumference of the pipe and the width of the strips applied thereto. In the simpler case, fewer rotations may be required.

It will be appreciated that during the surfacing process, coolant, for example water, is constantly flowing through the coupler 26 and the tube 29 into the tube 13 to cool the device. The hood 36 concentrates the flux in the area of welding, and the perforations assist to dissipate heat, gases and the pressurized air carrying the flux during the welding process.

What I claim is:

1. An arc welding device for applying a protective surface to the interior of a hollow, electrically conductive metal article comprising elongated, tubular casing means formed of electrically insulating material for insertion into the hollow article; solid block means on one end of said casing means for connecting the device to a tractor for moving the device longitudinally in the hollow article; solid plug means in the other end of said tube means; solid first tube means extending between said block means and said plug means; second tube means coaxial with and smaller in diameter than said first tube means extending through said block means, said first tube means and into said plug means; plastic conduit means extending through said second tube means for carrying a consumable welding electrode through said second tube means into said plug means;

arcuate contact tip means in said plug means for receiving said electrode and directing the electrode into contact with the interior of the article; flux inlet means for introducing welding flux into the block means end of said casing means; flux outlet means in the plug means end of said casing means for discharging the welding flux into the area of the outer free end of said tip means; coolant inlet means extending into said first tube means for introducing coolant into the plug means end of said first tube means; and coolant outlet means for discharging coolant from the block means end of said first tube means, whereby a consumable electrode can be fed through said conduit means and the tip means into electrical contact with the interior of the article while flux is fed to the contact area and the device is moved longitudinally to deposit a strip of metal on the interior of the article.

2. A device according to claim 1, including guide means on said casing means for extending into contact with the article to guide the device during movement along the interior of the article.

3. A device according to claim 2, including partition means in said casing means proximate the block means end thereof, said partition means surrounding said first tube means upstream of said flux inlet means in the direction of travel of flux from the block means end to the plug means end of the casing means.

4. A device according to claim 2, wherein said coolant outlet means includes a passage in said block means in fluid communication with one end of said first tube means for receiving and discharging coolant therefrom.

5. A device according to claim 2, wherein said guide means includes sleeve means on said casing means; and arm means extending outwardly from said sleeve means for guiding contact with the interior of the article.

6. A device according to claim 2 including hood means on the plug means of said casing means for directing welding flux to a welding zone.

7. A method of applying a protective surface to the interior surface of a hollow, electrically conductive metal article comprising the steps of applying a first rectilinear strip of welding metal to one side of the interior surface; rotating the article through 180 degrees in one direction around a first axis parallel to the longitudinal axis of the strip; applying a second rectilinear strip of metal to a second side of the interior surface opposite to said one side; rotating the article in said one direction to said one side; rotating the article in said one direction through 90 degrees around the first axis; applying a third rectilinear strip of metal to the interior of the article between the first and second strips; rotating the article in said one direction through 180 degrees around the first axis; and applying a fourth rectilinear strip of metal to the interior of the article opposite the third strip.

8. A method according to claim 7, including the steps of rotating the article in one said direction through 135 degrees around the first axis; applying a fifth rectilinear strip of metal to the interior of the article between the second and third strips; rotating the article in said one direction through 180 degrees around the first axis; applying a sixth rectilinear strip of metal to the interior of the article opposite the fifth strip; rotating the article in said one direction through 90 degrees around the first axis; applying a seventh rectilinear strip of metal to the interior of the article between the second and fourth strips; rotating the article in said one direction through 180 degrees around the first axis; and applying an eighth rectilinear strip of metal to the interior of the article opposite the seventh strip.

9. A method according to claim 8 including the steps of continuing alternately to rotate the article in said one direction around the first axis and applying additional rectilinear strips of metal to the interior of the article between existing strips until the interior of the article is completely surfaced.

* * * * *